July 13, 1965  R. M. CHRISTENSON ETAL  3,194,777
COATING COMPOSITIONS
Filed May 8, 1961
COATING OF INTERPOLYMER OF METHYL METHACRYLATE AND ALKYL ESTER OF METHACRYLIC ACID CONTAINING AT LEAST 8 CARBON ATOMS IN ALKYL GROUP
PRIMER COATING
SURFACE
INVENTORS
ROGER M. CHRISTENSON
DONALD P. HART
BY HENRY A. VOGEL and
KARL R. GOSSELINK
Oscar Spencer
ATTORNEY

United States Patent Office

3,194,777
Patented July 13, 1965

3,194,777
COATING COMPOSITIONS
Roger M. Christenson, Gibsonia, Donald P. Hart, Allison Park, and Henry A. Vogel, Gibsonia, Pa., and Karl R. Gosselink, Rocky River, Ohio, assignors to Pittsburgh Plate Glass Company, Pittsburgh, Pa., a corporation of Pennsylvania
Filed May 8, 1961, Ser. No. 108,292
13 Claims. (Cl. 260—31.8)

This application is a continuation-in-part of application Serial No. 584,474, filed May 14, 1956, now abandoned.

This invention relates to novel protective coating compositions which possess many outstanding properties, including excellent durability, gloss retention, and humidity resistance, and pertains more specifically to protective coating compositions having copolymers of methyl methacrylate with polymerizable esters of unsaturated carboxylic acids as the principal resinous components thereof.

For many years attempts have been made to utilize the outstanding properties of methyl methacrylate polymers in protective coating compositions. However, because of several undesirable characteristics, particularly a tendency of the solutions to "veil" or "web" when sprayed and because of a tendency of the film to be too brittle and crack when baked, very little use had been made of methyl methacrylate polymers in the field of protective coatings until the last few years.

It was then learned that by accurate control of molecular weight, methyl methacrylate polymers could be obtained which in solution could be sprayed without webbing to give films having many useful properties. Such coatings are composed of either polymethyl methacrylate, or a polymer of methyl methacrylate with 5 percent or less of a co-monomer having an alkyl group containing from 1 to 4 carbon atoms, for example ethyl acrylate or butyl acrylate.

It has now been discovered that the useful properties of the materials described in the preceding paragraph can be even further enhanced if methyl methacrylate is copolymerized with at least about 10 percent by weight of an alkyl ester of methacrylic acid, wherein the alkyl group contains at least 8 carbon atoms, and preferably from 8 to 18 carbon atoms. By utilizing as the copolymerizing monomer an alkyl methacrylate having an alkyl chain of at least 8 carbon atoms, and employing said alkyl methacrylate in an amount of at least about 10 percent by weight as opposed to the use of no more than about 5 percent by weight of a $C_1$–$C_4$ alkyl methacrylate, the following important advantages are obtained:

(1) The humidity resistance of the films obtained from the compositions of this invention is superior to the humidity resistance of films obtained heretofore.

(2) The craze resistance, that is, resistance to the formation of fine cracks in the film, is greatly improved.

(3) The initial unpolished gloss, and the gloss retention upon exposure to moisture are improved.

(4) Copolymers of methyl methacrylate with at least about 10 percent by weight of an alkyl methacrylate having an alkyl group containing at least 8 carbon atoms have flexibility inherent in their structure, and hence require a minimum amount of external plasticizer to render them flexible to the proper degree for incorporation in a coating composition. When polymethyl methacrylate or a copolymer of methyl methacrylate with 5 percent or less of a $C_1$–$C_4$ modifying monomer is utilized, relatively large amounts of external plasticizer must be employed and the durability of the resulting film is decreased.

(5) Copolymers of methyl methacrylate with at least about 10 percent by weight of an alkyl ester of methyl methacrylate containing at least 8 carbon atoms in the alkyl group give a greater film hardness at a desired flexibility than do methyl methacrylate homopolymers or copolymers of methyl methacrylate with 5 percent or less of a modifying monomer.

(6) Coating compositions prepared from copolymers of methyl methacrylate containing at least about 10 percent by weight of an alkyl ester of methyl methacrylate containing at least 8 carbon atoms in the alkyl group possess excellent recoatability whereas methyl methacrylate homopolymers require special adjustment of solvents and film formers to achieve an acceptable degree of recoatability.

Because of the outstanding properties disclosed hereinabove, the coating compositions of this invention are particularly useful as finishes for automobiles, and require a minimum of polishing and other care to retain an excellent surface appearance for extended periods of time. However, the coating compositions herein described may also be utilized on other surfaces such as wood, plastics, or the like with good results.

As indicated hereinabove, the monomer which is polymerized with methyl methacrylate to form copolymers to be utilized in the coating compositions of this invention is an alkyl ester of methacrylic acid wherein the alkyl group contains at least 8 carbon atoms. Examples of monomers which function satisfactorily for this purpose are octyl methacrylate (either the normal octyl or the 2-ethylhexyl compound), lauryl methacrylate, decyl-octyl methacrylate, nonyl methacrylate, decyl methacrylate, as well as other alkyl acrylates wherein the alkyl group contains at least 8 carbon atoms. Mixtures of two or more of these modifying monomers may be utilized.

The modifying monomers, that is, the alkyl ester of methacrylic acid containing at least 8 carbon atoms in the alkyl group is preferably utilized in an amount of at least about 10 percent to 30 percent by weight, and the methyl methacrylate from 70 percent to 90 percent by weight. However, amounts as high as about 50 percent by weight of the modifying alkyl methacrylate may also be utilized to give copolymers which impart the desired characteristics to the coating compositions. The exact quantity of the alkyl ester containing at least 8 carbon atoms in the alkyl group will, of course, depend upon the particular ester utilized. Lauryl methacrylate has been found to be the preferred modifying monomer, since it combines the optimum degree of plasticizing ability with other useful characteristics.

It is also desirable in some instances to incorporate a small amount, for example, about 1 percent to about 5 percent of an unsaturated carboxylic acid such as acrylic acid or methacrylic acid, into the interpolymer.

The copolymers of methyl methacrylate and alkyl methacrylate in which the alkyl group contains at least 8 carbon atoms should possess a relative viscosity ($N_r$) in the range of 1.150 to 1.260, and preferably 1.180 to 1.250, to function satisfactorily in coating compositions. Relative viscosity (also known as viscosity ratio) is defined as follows:

$$N_r = \frac{\text{efflux time of polymer solution in seconds}}{\text{efflux time of solvent solution in seconds}}$$

The efflux times are measured in accordance with the procedure of A.S.T.M. D–445–46T (Method B) using as the oil of said procedure (1) a solution of 0.25 gram of the methyl methacrylate copolymer in 50 cc. of ethylene dichloride, and (2) a sample of the ethylene dichloride utilized in making the solution. The determinations are run at 25° C. in an Ostwald Viscometer, Series 50.

The above relative viscosity range of 1.150 to 1.260 corresponds to a molecular weight in the range of about 87,000 to 150,000. The equation utilized in determining molecular weight is as follows, wherein the constants for polymethyl methacrylate are employed:

$$M.W. = 1.47 \times 10^6 (N_r - 1 - \ln N_r)^{0.65}$$

where $$N_r = \frac{\text{efflux time of polymer solution in seconds}}{\text{efflux time of solvent solution in seconds}}$$

In accordance with the present invention methyl methacrylate copolymers having relative viscosities in the range of 1.150 to 1.260 can readily be sprayed from solvents at a useful solids content without webbing or veiling, whereas methyl methacrylate homopolymers or copolymers of methyl methacrylate containing 5 percent or less of a modifying monomer have been reported as being sprayable without veiling or webbing only at molecular weights below 105,000. The exact reason why copolymers of methyl methacrylate containing at least about 10 percent of an alkyl methacrylate in which the alkyl group contains at least 8 carbon atoms are superior to previous methyl methacrylate polymer coatings is not known. However, it is believed to be due largely to the fact that the polymerization methods described hereinbelow produce selectively polymers having a rather narrow molecular weight range, that is, there are at most only very minor quantities of short chain polymers, which do not have good humidity resistance, and only very minor quantities of long chain, very high molecular weight polymers. The presence of appreciable quantities of high molecular weight polymers tends to produce veiling and webbing.

The influence of temperature on the polymerization reaction is also quite important. With given levels of catalyst and chain modifier, too low temperatures will yield a polymer too high in molecular weight to give acceptable sprayability. Excessively high temperatures will yield a polymer with poor flexibility, poor cold crack behavior and poor humidity and water resistance. Conditions of polymerization must be selective to give a suitable product.

Copolymers having the desirable viscosity characteristics described hereinabove can be obtained by either emulsion polymerization, solution polymerization, or suspension (bead or pearl) polymerization. Preferably, a suspension polymerization process is utilized. This type of polymerization may be considered as a bulk polymerization and is carried out ordinarily by admixing a water solution containing a protective colloid (such as polyvinyl alcohol, an alkali metal salt of a polyacrylate, such as sodium polyacrylate, or a polyacrylamide, bentonite, starch, acetylated starch, magnesium silicate, or the like) together with a small quantity of an aqueous buffer solution which may be a phosphate, such as a mixture of monosodium phosphate and disodium phosphate, and a second solution consisting of the monomers, catalyst and a chain transfer agent. The reactor is purged with an inert gas, and rapid agitation is initiated to form beads of about 0.1 to 5 millimeters in diameter. Heat is supplied by water and/or steam to produce a reaction temperature of about 70° C. to 90° C., these conditions being maintained for about 1½ to 3 hours to give complete conversion. The reactor is cooled to about room temperature and the beads can be readily recovered by filtration through paper, a glass cloth, or a fine silk cloth. Yields of about 90 percent to 100 percent are obtained in this manner.

In the emulsion polymerization process the monomers, water, chain transfer agent, wetting agent, and catalyst are admixed with vigorous agitation, the mixture being heated to a temperature of about 70° C. to 95° C. After a reaction period of about an hour, the reaction mixture is cooled to room temperature and the latex precipitated by the addition of an alcohol which is at least partially soluble in water, such as methanol, ethanol, or isopropanol, or an acid such as hydrochloric acid or the like.

Solution polymerization is carried out by refluxing the monomers in a solvent or mixture of solvents until polymerization proceeds to form a polymer having a relative viscosity of from 1.150 to 1.260. The solution thus formed can be utilized per se as a coating composition, or can be utilized in formulating compositions as described hereinafter.

In order to obtain a bead or emulsion copolymer of methyl methacrylate and an alkyl ester of an unsaturated carboxylic acid having a relative viscosity of from 1.150 to 1.260, necessary to produce useful coating compositions, it is important that a chain transfer agent (also known as a chain modifying agent) be incorporated in the polymerization mixture. The use of the chain transfer agent permits accurate control of viscosity or molecular weight by preventing the formation of addition polymers of high molecular weight. The mercaptans, such as dodecyl mercaptan, tertiary dodecyl mercaptan, octyl mercaptan, hexyl mercaptan, and the like are greatly preferred for this purpose. However, other chain transfer agents such as carbon tetrachloride, allyl acetate, allyl carbamate, isopropyl benzene, butyl chloride, acetic acid, dioxane, and the like can be used to secure regulated molecular weights. Ordinarily, the amount of chain transfer agent which is utilized can be varied considerably. However, in the suspension type of polymerization it has been found that approximately 0.1 percent to 2.0 percent by weight of the chain transfer agent based on the monomer weight is preferably utilized, whereas in the emulsion polymerization about 0.2 percent to 1.0 percent by weight of chain transfer agent is sufficient to give polymers which possess a relative viscosity of from 1.150 to 1.260.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diphthalate, t-perphthalic acid, t-butyl peracetate, potassium persulfate, ammonium persulfate, and the like. Mixtures of two or more of the above compounds also may be used. The diazo compounds such as alpha, alpha-azo-di-iso-butyronitrile or p-methoxyphenyl diazo-thio-(2-naphthyl) ether are also useful as polymerization catalysts.

The quantity of catalyst employed can be varied considerably; however, in most instances it is desirable to use from about 0.2 percent to 2.0 percent based upon the weight of the monomers charged into the polymerization reaction.

It is reported that homopolymers of methyl methacrylate or copolymers of methyl methacrylate with 5 percent or less of modifying monomer can be formulated into coating compositions having a practical value only when certain critical solvent combinations are employed. On the other hand, the copolymers prepared in the manner disclosed hereinabove can be formulated into useful coating compositions without difficulty.

Inexpensive solvents are fully adequate to dissolve the copolymers to give compositions which will spray without webbing. The preferred solvents are the aromatic hydrocarbons such as toluene and xylene; the ketones such as acetone, methyl ethyl ketone, methyl amyl ketone, and the like; and esters such as Cellosolve acetate (monoethyl ether of ethylene glycol acetate), ethyl acetate, isopropyl acetate, amyl acetate, and the like. Aliphatic hydrocarbons such as heptane and octane and alcohols such as methyl acohol, isopropyl alcohol, amyl alcohol, diacetone alcohol and the like may also be employed, but preferably in minor quantities. It is to be understood, of course, that the above solvents are representative merely and by no means include all of the solvents which can be utilized in formulating the coating compositions of this invention.

In order to obtain optimum adhesion of the lacquer to the undercoat, and to provide for good solvent release, it is desirable that a small amount of an external plasticizer be employed. The preferred palsticizer for this purpose is butyl benzyl phthalate. Other plasticizers may also be used, including such compounds as tricresyl phosphate, dioctyl phthalate (di-2-ethylhexyl phthalate), dicyclohexyl phthalate, di-3,5,5-trimethylhexyl phthalate, butyl cyclohexyl phthalate, epoxidized oils, castor oil acetoacetate, and the like. As indicated hereinabove, it is an advantage of utilizing copolymers of methyl methacrylate and alkyl esters of unsaturated carboxylic acids over homopolymers of methyl methacrylate in that with the former the quantity of plasticizer utilized is preferably in the range of about 10 percent to 15 percent by weight, based on the total solids weight of resin plus plasticizer, whereas with the latter polymers about 30 percent of plasticizer (on the same weight basis) must be incorporated in order to obtain desired flexibility in the resultant films. The presence of larger amounts of plasticizer, for example, on the order of 30 percent, tends also to decrease the very important humidity and water resistance properties of the film. However, where these properties are not of primary consideration, amounts of plasticizer as low as about 5 percent or as high as about 30 percent or even higher can be utilized.

In order to obtain a composition which will spray readily to give good coverage without veiling or webbing, it is desirable that the copolymer, plasticizer, if any, and solvent be proportioned so that the polymer solids content of the composition is in the range of about 9 percent to 15 percent. If the percentage is substantially lower than about 9 percent, a number of separate coats may be necessary in order to obtain the desired film thickness and hiding properties.

In pigmenting the coating compositions containing methyl methacrylate polymers, any of the pigments commonly used in organic coating compoistions may be employed, it being understood, of course, that where the compositions are to be used for coatings exposed to outdoor conditions, pigments which do not deteriorate on exterior exposure should be used. However, because of the excellent exterior durability of the methyl methacrylate copolymers, it has been found that even many of those pigments which are not accpetable for use in nitrocellulose lacquers, can readily be employed in the coating compositions of this invention. Among pigments which may be used are carbon black, titanium dioxide, phthalocyanine greens and blues, metal oxides, sulfides, and the various metallic flake pigments such as aluminum flake. In addition to color pigments, other additives conventionally used in coating compositions may also be employed. These include fillers or extenders such as talc, kieselguhr, clays, silicates, and diatomaceous earth. Other additives include silicones, and other film forming materials such as nitrocellulose, polyvinylacetal resins and the like.

In applying the coating compositions of this invention to metal surfaces such as automobile bodies, it is preferred that the surface first be properly primed by the application of one of several types of base coats. One process of preparing the metal surface for application of the coating compositions containing a copolymer of methyl methacrylate involves application to the bare metal surface, which is usually bonderized, of a so-called "flash-primer," such as is described in copending application, Serial No. 532,112, filed September 1, 1955. Over the flash-primer is applied a film of a highly pigmented surfacer which serves to fill irregularities in the metal surface and to provide a film which can be easily made smooth by sanding.

The coating compositions of this invention can be applied directly over the surface thus prepared; however, better adhesion of the final coat to the primer is obtained if an intermediate sealing coat is applied to the surface. This seal coat can be a plasticized nitrocellulose composition of low viscosity, or a nitrocellulose-alkyd resin composition, or even a low viscosity polymethyl methacrylate coating. Whether or not a seal coat is utilized, the total thickness of the undercoat should be several mils in order to provide suitable filling for sanding, and to provide good gloss holdout of the finish coating.

Alternatively, the metal surface can be prepared for application of the top coat by means of a single film of a so-called "primer-surfacer" which, as the name implies, provides both priming and filling properties. Such a primer-surfacer is highly pigmented, and may contain as the film forming constituent, nitrocellulose, a polyvinylacetal resin, shellac, an alkyd resin, or a mixture of two or more of said film forming materials. The base coats should ordinarily be baked before the application of the finish coating.

The finish or top coats of the compositions of this invention are best applied by spraying in two or more separate passes over the primed surface in order to get a film thickness of from about 1.5 mils to 3.5 mils. For best results, the coating compositions should have a total solids content of about 12 percent to 25 percent, and preferably from 15 percent to 20 percent. After application is completed the film is baked for about 20 minutes to 30 minutes at approximately 180° F. to give a film having excellent gloss and the outstanding durability properties described hereabove.

It has been found that the mar-resistance and the polishing qualities of the final film can be greatly improved by incorporating into the composition a very small amount of polyethylene. For example, amounts as low as 1.0 percent to 10.0 percent based on total resin solids, plasticizer, and polymer, are sufficient to improve substantially the mar-resistance and polishing properties of the film. The polyethylene is ordinarily incorporated into the coating composition in the form of a dispersion in a liquid such as toluene or xylene. Among the polyethylenes which may be employed are those sold under the following trade names: AC–6 and AC–629, sold by the Semet-Solvay Division of Allied Chemical and Dye Corporation, and DYDT and DYGT, sold by Bakelite Division of Union Carbide Chemicals Company. The polyethylene designated as DYGT possesses approximately the following properties:

Molecular weight _____ 7000
Approximate softening temperature, ° C. _____ 98
Viscosity at 130° C. in poises _____ 120
Tensile strength (pounds per square inch) _____ 615
Percent elongation _____ 40
50 percent brittle temperature index (A.S.T.M.
　D–746–447), ° C. _____ −16

The polyethylenes bearing the designations AC are also white, wax-like polymers which melt at about 85° C. AC–629 possesses an acid number of 14 to 17, an impact strength of 4.8 foot pounds per inch and a Saybolt Furol second viscosity of 120. While specific properties of these polyethylenes are set forth herein, it is to be understood that any polymer of ethylene may be employed to enhance the properties of the coating compositions of this invention.

Finishing systems of the invention are illustrated by the accompanying drawing, in which the single figure shows an enlarged cross-sectional view of a representative portion of a two-layer coated metal article of the invention.

The following examples illustrate in detail the preparation of copolymers of methyl methacrylate with alkyl esters of unsaturated carboxylic acids, and the formulation of such copolymers into the coating compositions of this invention. The examples are not intended to limit the invention, however, for there are, of course, numerous possible variations and modifications.

EXAMPLE I

A series of copolymers of methyl methacrylate with octyl methacrylate, decyl-octyl methacrylate and lauryl methacrylate was prepared by suspension polymerization utilizing in each charge 10 parts of an aqueous buffer solution prepared with a ratio of 1.7 parts by weight of disodium hydrogen phosphate and 0.1 part of sodium dihydrogen phosphate, and employing 1 part of benzoyl peroxide as a catalyst. The pertinent data are reported in the following table in which all parts are by weight:

| Modifying Monomer | Parts Modifying Monomer | Parts Methyl Methacrylate | Parts Water | Parts Tertiary Dodecyl Mercaptan | Suspension Agent | Polymer Viscosity¹ Gardner-Holdt (25 percent Solution in Toluene) |
|---|---|---|---|---|---|---|
| Octyl Methacrylate | 10 | 90 | 280 | 0.5 | Codium polyacrylate (20 parts of 15 percent aqueous solution). | E |
| Do | 20 | 80 | 280 | 0.5 | ____do____ | E |
| Decyl-Octyl methacrylate¹ | 10 | 90 | 280 | 0.5 | ____do____ | H |
| Lauryl Methacrylate | 10 | 90 | 280 | 0.5 | ____do____ | H |

¹ Mixture of decyl methacryalte and octyl methacrylate.

Each of the four polymers prepared according to this example was formulated into an automotive lacquer. The resulting laquers were then sprayed onto primed metal panels and the laquer baked for 30 minutes at 180° F. The panels had excellent initial gloss and gloss retention, and successfully passed a 100 hour humidity test. The films showed no deterioration in a conical bend test and did not check to any significant extent when subjected to 10 cycles of alternate heating to 150° F. in an oven and immersion in an ethylene glycol-Dry Ice bath at −60° F.

EXAMPLE II

A bead polymer of methyl methacrylate and lauryl methacrylate was prepared as follows:

A mixture of 1495 parts by weight of water and 5 parts of an acetylated starch (Kofilm No. 50) was heated with agitation to 80° C. until an almost clear solution was obtained. Fifty (50) parts of buffer solution (prepared by admixing 1 part sodium dihydrogen phosphate, 17 parts disodium hydrogen phosphate and 100 parts water) was added. To the resulting mixture was added a mixture of 450 parts methyl methacrylate, 50 parts lauryl methacrylate, 5 parts benzoyl peroxide, and 6.25 parts of tertiary dodecyl mercaptan. The resulting polymerization mixture was then heated with agitation to 75° C.–80° C. for 3 hours, after which the mixture was cooled to 30° C., filtered, washed with water and dried at 140° F. for 16 hours. Clear beads of polymer were obtained. When dissolved to a total solids content of 36 percent in toluene, the polymer solution had a Gardner-Holdt viscosity of S.

EXAMPLE III

This example illustrates the preparation of a copolymer of methyl methacrylate and lauryl methacrylate which contains a small amount of the acidic monomer, methacrylic acid. The polymer was prepared as follows:

One thousand four hundred ninety five (1495) parts by weight of water and 5 parts of acetylated starch (Kofilm No. 50) were heated to 80° C. until an almost clear solution was obtained. Fifty (50) grams of the buffer solution of Example II were then added. To the resulting mixture was added a mixture of 340 parts methyl methacrylate, 150 parts lauryl methacrylate, 10 parts methacrylic acid, 5 parts benzoyl peroxide and 7.5 parts of tertiary dodecyl mercaptan. The resulting mixture was heated with agitation to a temperature in the range of 75° C. to 80° C. for a period of 3 hours with constant stirring at an agitator speed of 240 revolutions per minute. After the heating period, the polymerization mixture was cooled to 30° C., filtered and washed with water. After drying at 140° F. for 16 hours, 450 parts of dry beads were obtained. A solution of the beads in toluene (total solids 39.85 percent) had a Gardner-Holdt viscosity of W and an acid value of 8.0.

EXAMPLE IV

A solution copolymer of methyl methacrylate and lauryl methacrylate was prepared by refluxing a mixture of 700 parts by weight of toluene, 300 parts by weight of acetone, 900 parts methyl methacrylate, 100 parts lauryl methacrylate, and 5 parts benzoyl peroxide. The reflux was carried out for 4 hours at a temperature in the range of about 77° C.–81° C., after which another 500 parts of toluene was added and the reflux continued for 3 hours at about 81° C. A further addition of 1000 parts of toluene was made, after which 640 parts of solvent were distilled off at a maximum temperature of 110° C. The resulting polymer solution had a solids content of 35.4 percent and a Gardner-Holdt viscosity of U+. The relative viscosity of the solution was 1.208, which corresponds to a molecular weight of approximately 112,000.

EXAMPLE V

A mixture of 700 parts toluene, 300 parts acetone, 680 parts methyl methacrylate, 300 parts lauryl methacrylate, 20 parts methacrylic acid, and 5 parts of benzoyl peroxide was refluxed for a total of 8 hours at temperatures in the range of 75° C. to 80.5° C. One and twenty five hundredths (1.25) parts of benzoyl peroxide and 12 parts of toluene were added to the refluxing mixture at the end of the first and second two-hour period of the reflux. At the end of the reflux period 450 parts of acetone was added and the solution cooled. The solution had a solids content of 37.8 percent, a Gardner-Holdt viscosity of F−, a relative viscosity of 1.170, and an acid value of 7.0.

EXAMPLE VI

The methyl methacrylate-lauryl methacrylate copolymer solution of Example II (36 percent solids) was formulated into a white lacquer according to the following formulation:

| Component: | Parts by weight |
|---|---|
| White pigment paste (mixture of titanium dioxide and polymer solution of Example II) | 89 |
| Polymer solution of Example II (36 percent solids in toluene) | 191 |
| Dicyclohexyl phthalate | 15 |
| Santicizer 160 | 8 |
| Toluene | 16 |
| Isopropyl alcohol | 4 |

The resulting formulation was then reduced to spray viscosity with a solvent mixture comprising 20 parts acetone, 20 parts toluene, 25 parts xylene, 25 parts Cellosolve acetate and 10 parts isopropyl alcohol.

EXAMPLE VII

A bead polymer of methyl methacrylate and stearyl methacrylate was prepared as follows:

A mixture of 280 parts water, 20 parts of the sodium salt of polyacrylic acid (15 percent solution in water) and 10 parts of the buffer solution of Example II was prepared. To the mixture a second mixture of 90 parts of methyl methacrylate monomer, 10 parts of stearyl methacrylate monomer, 1 part of benzoyl peroxide and 0.65 part of tertiary dodecyl mercaptan were added with constant stirring. The resulting polymerization mixture was then heated with agitation for 2½ hours at a temperature in the range of about 76° C. to 79° C., after which the mixture was cooled to 30° C., filtered and washed with water and dried for 16 hours at 180° F. When dissolved to a solids content of 25 percent in toluene, the solution had a Gardner-Holdt viscosity of E–F.

EXAMPLE VIII

In order to compare the methyl methacrylate polymer coating compositions of this invention with coating compositions obtained by utilizing predominantly methyl methacrylate homopolymers as the resinous components thereof, coating compositions were prepared from homopolymers produced according to Example 8 of U.S. Patent 2,934,510. Two homopolymers were prepared, one having a molecular weight of about 90,000 and the other a molecular weight of about 102,000. These polymers were then formulated into white lacquers as follows:

A pigment paste was prepared from each of the two polymethyl methacrylate polymers. The pigment pastes had the folowing composition:

| | Parts by weight |
|---|---|
| Titanium dioxide | 450 |
| Polymethyl methacrylate | 120 |

The above mixture was then ground and let down with an additional 167 parts of a polymethyl methacrylate and 163 parts of toluene. The pigment pastes thus prepared were formulated into coatings with the following composition:

| Component | Parts by Weight | |
|---|---|---|
| | 90,000 Molecular Weight Polymer | 102,000 Molecular Weight Polymer |
| Pigment Paste | 100 | 100 |
| Polymethyl methacrylate (Molecular Weight 90,000) | 443 | |
| Polymethyl methacrylate (Molecular Weight 102,000) | | 443 |
| Santicizer 160 | 80.5 | 80.5 |

The above lacquer concentrates were thinned to spray viscosity with the thinners described in U.S. Patent 2,934,510 in an amount of 100 parts of the lacquer concentrate to 144 parts of the thinner. These lacquers, and the white lacquer of Example VI were then applied over a conventional alkyl resin primer-surfacer which had been applied to a metal surface and baked for 45 minutes at 275° F. The lacquers were then baked at two different schedules, 30 minutes at 180° F. and 30 minutes at 240° F. The panels were then tested by placing them in water for 500 hours, after which they were examined for blistering and gloss. The results are reported in the following table:

| | Lacquers From Polymers of U.S. Patent 2,934,510 | Lacquers From Polymers of Example VI |
|---|---|---|
| After 500 hours and high humidity | Small blisters over 100% of surface. | No blistering. |
| Initial Gloss | 90 | 88. |
| Gloss after 500 hours in high humidity (60° glossmeter). | 78–81 | 88. |

It is apparent from the foregoing table that coating compositions prepared from copolymers of methyl methacrylate with an alkyl ester of methacrylic acid having at least 8 carbon atoms in the alkyl group are outstandingly superior to lacquers prepared from methyl methacrylate homopolymers with respect to humidity resistance.

To compare the above coatings further, the panels which had been coated with the black lacquers described above and baked for 30 minutes at 180° F. were then recoated and baked for an additional 30 minutes at 180° F. The coatings prepared according to the methods of U.S. Patent 2,934,510 exhibited substantial crazing, whereas the panels prepared from the lacquers of this invention exhibited no crazing.

Additional panels of the two types of lacquers were exposed to the action of salt air in Florida for a period of 3 months and then subjected to a cold cycle test which consisted of alternate cycles of 24 hours at 100 percent humidity and 100° F., and then 20 hours at a temperature of −10° F. The panels coated with the lacquers prepared according to the example of the U.S. patent failed by cracking in the sixth cycle and showed complete failure in the sixteenth cycle, whereas the lacquer prepared according to the method of this invention did not show even a trace of cracking until the seventeenth cycle and exhibited only slight failure after the thirtieth cycle when the test was discontinued.

Although specific examples of the invention have been set forth hereinabove, it is not intended that the invention be limited solely thereto, but to include all of the variations and modifications falling within the scope of the appended claims.

We claim:

1. An inert organic solvent based coating composition, the resinous film-forming component of which consists essentially of an interpolymer of from about 50 percent to about 90 percent by weight of methyl methacrylate and 10 percent to 50 percent by weight of an alkyl ester of methacrylic acid in which the alkyl group contains from 8 to about 18 carbon atoms, said interpolymer having a relative viscosity of from 1.150 to 1.260.

2. The coating composition of claim 1 wherein from about 10 percent to 30 percent by weight of a plasticizer is present, based on the total solids weight of resin plus plasticizer.

3. The cotaing composition of claim 2 wherein the alkyl ester is lauryl methacrylate.

4. The coating composition of claim 2 wherein the alkyl ester is octyl methacrylate.

5. The coating composition of claim 2 wherein the alkyl ester is decyl-octyl methacrylate.

6. The coating composition of claim 2 wherein the alkyl ester is lauryl methacrylate and wherein said interpolymer contains, in addition to the methyl methacrylate and lauryl methacrylate, about 1 percent to 5 percent of methacrylic acid in polymerized form.

7. A metallic article having a multiple layer coating thereon and adherent thereto, the top coat of which is a layer of the coating composition of claim 1.

8. An inert organic solvent based coating composition, the resinous film-forming component of which consists essentially of an interpolymer of from about 70 percent to about 90 percent by weight of methyl methacrylate and 10 percent to 30 percent by weight of an alkyl ester of methacrylic acid in which the alkyl group contains from 8 to about 18 carbon atoms, said interpolymer having a relative viscosity of from 1.150 to 1.260.

9. The coating composition of claim 1 wherein the said interpolymer contains in addition to the methyl methacrylate and the alkyl ester of methacrylic acid, from about 1 percent to about 5 percent by weight of an unsaturated carboxylic acid in polymerized form, said unsaturated carboxylic acid being selected from the group consisting of acrylic acid and methacrylic acid.

10. A coating composition consisting essentially of inert organic solvents, pigment, an interpolymer of about 50 percent to 90 percent by weight of methyl methacrylate and about 10 percent to 50 percent by weight of an alkyl ester of methacrylic acid, the alkyl group of said ester containing from 8 to 18 carbon atoms, said interpolymer having a relative viscosity of from 1.150 to 1.260, a plasticizer in an amount of about 10 percent to 30 percent by weight of the interpolymer plus plasticizer, and about 1.0 percent to 10 percent of polyethylene based on the total weight of said interpolymer plus plasticizer.

11. The coating composition of claim 10 wherein the said interpolymer contains about 70 percent to 90 percent by weight of methyl methacrylate and about 10 percent to 30 percent by weight of an alkyl ester of methacrylic acid wherein the alkyl group contains from 8 to 12 carbon atoms.

12. The coating composition of claim 11 wherein the alkyl ester is lauryl methacrylate and the plasticizer is butylbenzyl phthalate.

13. A metallic surface having as an exterior coating thereon a film of the coating composition of claim 10.

References Cited by the Examiner
UNITED STATES PATENTS

| | | | |
|---|---|---|---|
| 2,091,627 | 8/37 | Benson | 252—56 |
| 2,100,993 | 11/37 | Benson | 260—89.5 |
| 2,117,321 | 5/38 | Hill | 260—86.1 |
| 2,129,668 | 9/38 | Barrett et al. | 260—31.2 |
| 2,782,131 | 2/57 | Johnson | 117—75 XR |
| 2,795,564 | 6/57 | Conn et al. | 260—29.6 |
| 2,806,824 | 9/57 | Semegen | 260—45.5 |
| 2,870,111 | 1/59 | Dazzi | 260—31.8 |
| 2,887,404 | 5/59 | Evans | 117—75 |
| 2,934,509 | 4/60 | Crissy et al. | 260—30.6 |
| 2,934,510 | 4/60 | Crissy et al. | 260—31.8 |
| 2,978,357 | 4/61 | Fugazza | 117—75 |
| 2,995,468 | 8/61 | Steiger | 117—70 |
| 2,998,330 | 8/61 | Snyder et al. | 117—161 |
| 3,037,955 | 6/62 | Carman | 117/132 |

MORRIS LIEBMAN, *Primary Examiner.*

RICHARD D. NEVIUS, *Examiner.*